May 8, 1934.  A. KAZENMAIER  1,957,891
BRAKE MECHANISM FOR VEHICLES
Filed June 3, 1929
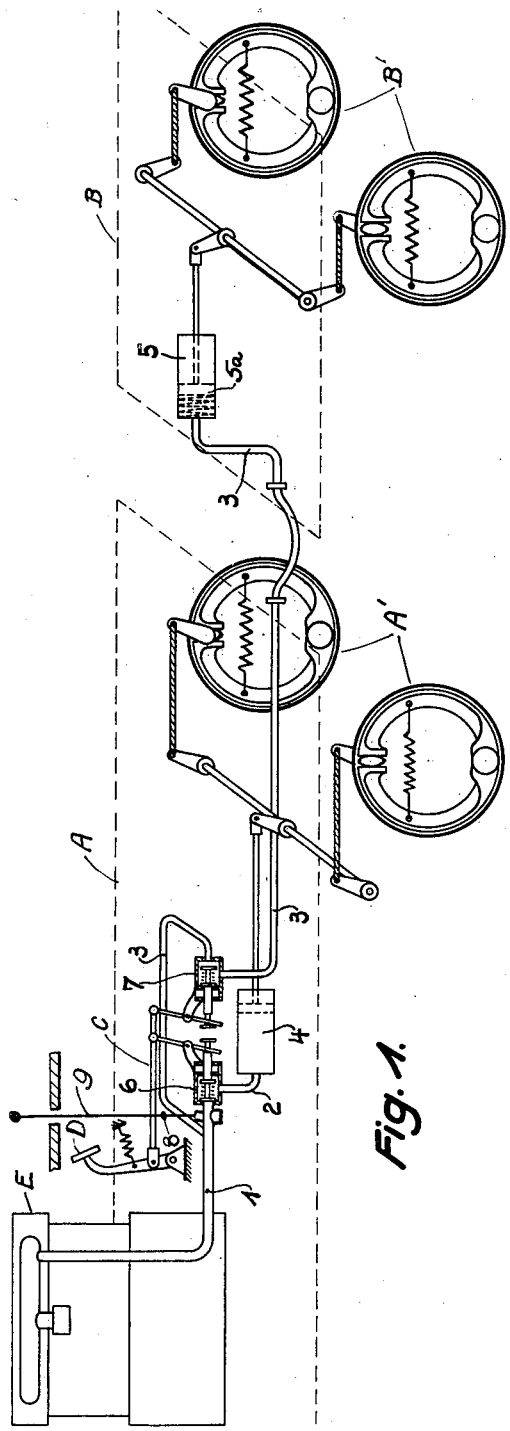

Patented May 8, 1934

1,957,891

UNITED STATES PATENT OFFICE 1,957,891

BRAKE MECHANISM FOR VEHICLES

August Kazenmaier, Stuttgart, Germany, assignor to Robert Bosch Aktiengesellschaft, Stuttgart, Germany Application June 3, 1929, Serial No. 368,106
In Germany October 18, 1928

8 Claims. (Cl. 188—3)

The present invention relates to brake mechanisms for vehicles, and more particularly for trains of tractor drawn vehicles.

In trains of vehicles in which the brakes of all the vehicles are controlled in common from one point, e. g. the driver's seat of a tractor such as a motor lorry, the trailer vehicle brakes should come into action before the tractor brakes in order to prevent troublesome and even dangerous slipping of the trailer.

According to the invention this is effected in vehicles in which the brakes are applied by vacuum or pressure operated servo mechanism by the ratio of the cross section of the passage in the brake pipes of the tractor and trailer brakes being altered as desired, and more particularly by the free cross section of passage of the brake pipe for the tractor brake cylinder being controlled by a throttle member adjustable from without in such a way that the desired retardation of the tractor brakes takes place. The throttle is preferably made adjustable from the driver's seat so that the driver can adjust the tractor brakes without loss of time under all driving conditions.

Two forms of construction according to the invention are shown by way of example in the accompanying drawing in which:—

Figure 1 shows diagrammatically a brake system in which a tractor is braked by vacuum set up by the driving internal combustion engine, whilst the trailer brake is released by this vacuum.

Figure 2 shows a simple example of one construction and arrangement of the throttle differing from the throttle valve used in the form of apparatus shown in Fig. 1.

Fig. 3 is an enlarged detailed view, partly in vertical side elevation and partly in vertical longitudinal section, showing the throttle valve employed in the Fig. 1 form of apparatus.

In Figure 1, the dotted rectangle A indicates a tractor provided with brakes A', and the rectangle B indicates a trailer drawn by the tractor A and provided with brakes B'. Numeral 1 indicates a suction pipe leading from the intake manifold of a driving engine E and branching into a branch 2 leading to a tractor brake cylinder 4 and a branch 3 leading to a trailer brake cylinder 5. Valves 6 and 7 respectively are inserted in the two branches of the pipe. These valves are coupled together by a link mechanism C in such a way that atmospheric pressure obtains in the brake cylinder 4 when the trailer brake cylinder 5 is under vacuum, and vice versa a vacuum obtains in the tractor brake cylinder 4 when the trailer brake cylinder 5 is connected with the atmosphere. The link mechanism is operated by a foot pedal D.

An adjustable slide valve 8 is inserted in the branch pipe 2 for the tractor brake cylinder 4. The suction of the air out of the brake cylinder 4 proceeds more slowly or rapidly according as the pipe 2 is throttled to a greater or less extent by the valve 8, so that the tractor brake can be adjusted at any time so that its maximum braking effect is only attained after the trailer brake has been fully operated or so that it can be attained immediately when the tractor is travelling alone. The operating handle 9 of valve 8 is preferably arranged near the driver's seat so that adjustment can be made at any time to meet different driving conditions, it being understood that the drawing is merely diagrammatic and does not show the details of the tractor.

A stop screw 10 with a conical end 11 is shown in Figure 2 as another form of the throttle. The stop screw is arranged in a valve housing 12 directly opposite the valve opening for the vacuum. When completely screwed up the conical end 11 closes the inlet opening for the vacuum.

Operation of the brake system is as follows: With the parts in the position shown in the drawing, valve 7 allows the trailer brake cylinder 5 to be operated by the vacuum from engine E to release the trailer brakes B' against the action of spring 5a, and valve 6 permits atmospheric pressure on both sides of the piston in cylinder 4, thereby allowing brakes A' to assume released position. When pedal D is pressed down, valve 7 cuts off the vacuum from cylinder 5 and admits atmosphere thereto. Thereupon the spring 5a operates to immediately set the trailer brakes B'. Simultaneously with the operation of valve 7, valve 6 establishes communication between suction pipe 1 and cylinder 4 through throttle valve 8. Cylinder 4 does not operate immediately to set tractor brakes A', but the operation is delayed somewhat beyond the operation of brakes B' due to the throttling of the air leaving the cylinder by the valve 8. The amount of delay may be readily adjusted to meet different loads and driving conditions by adjusting the opening of the valve 8. It is apparent that in case the vacuum connection becomes defective or is broken, the trailer brakes will be automatically set by the action of spring 5a. It will also be noted that with the throttle valve 8 located in the position shown, this valve serves to retard the application of the tractor brakes, but does not retard the releasing operation of these brakes.

I claim:

1. Brake operating mechanism for tractor and trailer vehicles comprising fluid-pressure-operated servo mechanism on a tractor and on a trailer, a source of suction, brake pipes connecting said source of suction with the servo mechanisms, a valve in each pipe connection for connecting the servo mechanism alternately to said source of suction or to atmosphere, and throttle means located between one of said valves and the source of suction for varying the ratio between the free cross-sectional area of the tractor brake pipe and that of the trailer, whereby the maximum brake effect of one brake is delayed beyond the other and both brakes are free to release simultaneously.

2. The combination with a tractor provided with brake mechanism and a trailer provided with independent brake mechanism, of means for applying and releasing said tractor and trailer brake mechanisms simultaneously, said means comprising an operator operated mechanism on said tractor, and additional operator operated means on said tractor for delaying the maximum braking effect of the tractor brakes beyond that of the trailer brakes without varying the releasing effect of said first mentioned means on said brakes.

3. The combination with a tractor provided with brake mechanism and a trailer provided with independent brake mechanism, of a fluid-pressure-operated servo-mechanism for each of said brake mechanisms, means operable at will for simultaneously setting both said servo-mechanisms into actuation to alternately apply and release the tractor and trailer brakes, and valve means in the fluid-pressure line of the tractor servo-mechanism manually adjustable to delay the maximum braking effect of the tractor brakes beyond that of the trailer brakes without retarding the releasing operation of said brakes.

4. Brake-operating mechanism for tractor and trailer vehicles comprising, in combination, a servo-mechanism on a tractor and on a trailer operating under differential fluid pressures, a source of sub-atmospheric fluid pressure on one of said vehicles, pipes connecting said mechanisms to said source of sub-atmospheric fluid pressure, a control valve in each of said pipes operable to connect said servo-mechanisms alternately to said source of sub-atmospheric fluid pressure and to the atmosphere, means connecting said control valves for their simultaneous operation to apply and release the tractor and trailer brakes, and a throttle valve located only in the pipe leading from the tractor control valve to the source of sub-atmospheric fluid pressure, whereby the maximum braking effect of the tractor brakes may be delayed beyond that of the trailer brakes without varying the releasing effect of said control valves on said brakes.

5. Brake-operating mechanism for tractor and trailer vehicles comprising, in combination, a servo-mechanism on a tractor and on a trailer operating under differential fluid pressures, a source of sub-atmospheric fluid pressure on one of said vehicles, pipes connecting said servo-mechanisms with said source of sub-atmospheric fluid pressure, control-valve means operable at will to connect said servo-mechanisms to said source of sub-atmospheric fluid pressure through said pipes and to the atmosphere alternatively for applying and releasing the tractor and trailer brakes simultaneously, the pipe connection between the servo mechanism on the trailer brakes presenting an unrestricted passage for the flow of fluid between said servo mechanism and said source of sub-atmospheric fluid pressure controlled only by said control-valve means and valve means independent of said control-valve means for restricting flow of fluid between the servo-mechanism on the tractor and said source of sub-atmospheric fluid pressure in a manner to delay the maximum braking effect of the tractor brakes beyond that of the trailer brakes without varying the releasing effect of said control-valve means on said brakes.

6. The combination with a tractor provided with an internal combustion engine for propelling the same and brake mechanism, and a trailer vehicle provided with independent brake mechanism, of servo-mechanism on the tractor actuated by vacuum to apply the tractor brakes and automatically actuating upon relief of the vacuum to release the tractor brakes, a servo-mechanism on the trailer actuated by vacuum to release the trailer brakes and automatically actuating upon relief of the vacuum to apply said brakes, fluid-flow connections from said servo-mechanisms to the intake manifold of the engine and to atmosphere to produce and relieve the vacuum in said servo-mechanisms, control-valve means operable at will for controlling said connections in a manner to apply and release said tractor and trailer brakes simultaneously, and manually operable throttle valve means for so proportioning the fluid flow through said connections as to delay the maximum braking effect of the tractor brakes beyond that of the trailer brakes without varying the releasing effect of said control-valve means on said brakes.

7. The combination with a tractor provided with an internal combustion engine for propelling the same and brake mechanism, and a trailer vehicle provided with independent brake mechanism, of servo-mechanism on the tractor actuated by vacuum to apply the tractor brakes and automatically actuating upon relief of the vacuum to release said brakes, a servo-mechanism on the trailer actuated by vacuum to release the trailer brakes and automatically actuating upon relief of the vacuum to apply said brakes, fluid-flow connections from said servo-mechanisms to the intake manifold of the engine and to atmosphere to produce and relieve the vacuum in said servo-mechanisms, control-valve means operable at will for controlling all of said connections in a manner to apply and release said tractor and trailer brakes simultaneously and manually operable throttle valve means in the connection between said tractor servo-mechanism only, and said intake manifold for adjustably reducing the flow of said fluid therethrough, whereby the maximum braking effect of the tractor brakes may be delayed beyond that of the trailer brakes without varying the releasing effect of said control-valve means on said brakes.

8. The combination with a tractor provided with an internal combustion engine for propelling the same and brake mechanism, and a trailer vehicle provided with independent brake mechanism, of servo-mechanism on the tractor actuated by vacuum to set the tractor brakes and automatically actuating upon relief of the vacuum to release said brakes, a servo-mechanism on the trailer spring-actuated to set the trailer brakes and by vacuum to release said brakes against the tension of the spring, said spring becoming effective to set the trailer brakes only upon release of the vacuum, pipe connections from said servo-mechanisms to the intake manifold of said engine and to atmosphere to produce and relieve the vacuum in said servo-mechanisms, control-valve means operating under spring pressure to simultaneously close the pipe connection between said tractor servo-mechanism and said intake manifold and open said servo-mechanism to atmosphere and to simultaneously open the pipe connection between said trailer servo-mechanism and said intake manifold and close said servo-mechanism to atmosphere for simultaneously releasing the brakes of said tractor and trailer, said control-valve means being operable at will against the tension of its spring to simultaneously open the pipe connection between said tractor servo-mechanism and said intake manifold and shut off said servo-mechanism from atmosphere and to simultaneously close the pipe connection between said trailer servo-mechanism and said intake manifold and open said servo-mechanism to atmosphere to simultaneously set the tractor and trailer brakes, and a manually operable throttle valve in the pipe connection between the tractor servo-mechanism and said intake manifold.

AUGUST KAZENMAIER.